US009952929B2

(12) United States Patent
Agombar et al.

(10) Patent No.: US 9,952,929 B2
(45) Date of Patent: Apr. 24, 2018

(54) REGAINING REDUNDANCY IN DISTRIBUTED RAID ARRAYS USING UNALLOCATED CAPACITY

(71) Applicant: International Business Machines Corporation, Armonk, NY (US)

(72) Inventors: John P. Agombar, Winchester (GB); Ian Boden, Eastleigh (GB); Gordon D. Hutchison, Eastleigh (GB); Lee J. Sanders, Chichester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/134,490

(22) Filed: Apr. 21, 2016

(65) Prior Publication Data
US 2017/0308436 A1  Oct. 26, 2017

(51) Int. Cl.
*G06F 11/10* (2006.01)
*G06F 11/16* (2006.01)

(52) U.S. Cl.
CPC ...... *G06F 11/1092* (2013.01); *G06F 11/1088* (2013.01); *G06F 11/1666* (2013.01); *G06F 2201/845* (2013.01)

(58) Field of Classification Search
CPC ............ G06F 11/1084; G06F 11/1088; G06F 11/1092
See application file for complete search history.

(56) References Cited

U.S. PATENT DOCUMENTS

| 7,587,630 | B1 * | 9/2009 | Cassell | G06F 11/1088 |
| | | | | 714/47.3 |
| 8,099,623 | B1 * | 1/2012 | Li | G06F 11/1084 |
| | | | | 714/6.22 |
| 8,402,213 | B2 | 3/2013 | Kamalavannan et al. | |
| 8,689,040 | B2 | 4/2014 | Kidney et al. | |
| 8,799,705 | B2 | 8/2014 | Hallak et al. | |
| 8,812,902 | B2 * | 8/2014 | Deepak | G06F 11/2094 |
| | | | | 714/6.21 |
| 9,235,486 | B1 * | 1/2016 | Casaburi | G06F 11/2094 |

(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

*Primary Examiner* — Yolanda L Wilson
(74) *Attorney, Agent, or Firm* — Robert J. Shatto

(57) ABSTRACT

A method and system are provided for spare capacity usage for critical redundancy in storage arrays. The method may include monitoring a Redundant Array of Independent Disks (RAID) array to determine whether one or more redundancy units are at a critical level. A redundancy unit may be in a critical level when an additional drive failure will result in loss of data from the redundancy unit. The method may further include identifying available regions in the RAID array which are not allocated to user data in response to determining that a particular redundancy unit is critical. The method may further include determining an available region for the particular redundancy unit, where the available region is in a drive of the RAID array that does not contain data of the particular redundancy unit. The method may further include storing a critical stripe in the available region.

18 Claims, 9 Drawing Sheets

(56) References Cited

U.S. PATENT DOCUMENTS

| | | | |
|---|---|---|---|
| 2002/0091965 A1* | 7/2002 | Moshayedi | G06F 11/004 714/6.13 |
| 2007/0067665 A1* | 3/2007 | Hashemi | G06F 3/0605 714/6.12 |
| 2010/0251012 A1* | 9/2010 | Zwisler | G06F 11/1092 714/6.32 |
| 2011/0225453 A1 | 9/2011 | Spry et al. | |
| 2012/0084600 A1* | 4/2012 | Kidney | G06F 11/1088 714/6.13 |
| 2014/0325262 A1* | 10/2014 | Cooper | G06F 11/1092 714/6.22 |
| 2016/0342476 A1* | 11/2016 | Nazari | G06F 12/0246 |

* cited by examiner

REGAINING REDUNDANCY IN DISTRIBUTED RAID ARRAYS USING UNALLOCATED CAPACITY

BACKGROUND

The present invention relates to distributed Redundant Array of Independent Disks (RAID) arrays, and more specifically, to regaining redundancy in distributed RAID arrays using unallocated capacity.

A RAID array is a data storage virtualization that combines multiple physical disk drives into a single logical unit for the purposes of data redundancy. Data is distributed across the drives in various ways depending on the required level of redundancy and performance, which determines which level of RAID array to use.

A RAID array has a set amount of redundancy based on how much parity is provided. For example, RAID 5 has one stripe of parity for a set of data stripes, and RAID 6 has two stripes of parity for a set of data stripes. Data can be considered critical if a single drive failure will result in loss of data. The use of spare drives allows redundancy to be regained; for example, a RAID 5 array becomes critical after a single drive failure, but it can rebuild that data onto a spare drive such that it becomes redundant again.

In a distributed RAID array, the data is split into redundancy units, which contain the associated parity, and those redundancy units are spread over the available drives. Spares can then be available either as a distributed spare or as an external/global spare. A redundancy unit only uses a subset of the drives, so in the case of a drive failure some redundancy units will lose redundancy and others will not.

SUMMARY

Embodiments of the present invention disclose a method, computer program product, and system for regaining redundancy in storage arrays. A computer system may monitor a Redundant Array of Independent Disks (RAID) array to determine whether one or more redundancy units are at a critical level. A redundancy unit may be in a critical level when an additional drive failure will result in loss of data from the redundancy unit. Each redundancy unit may have multiple data stripes and one or more parity stripes. The computer system may identify available regions in the RAID array which are not allocated to user data in response to determining that a particular redundancy unit is critical. The computer system may determine an available region for the particular redundancy unit, where the available region is in a drive of the RAID array that does not contain data of the particular redundancy unit. The computer system may store a critical stripe in the available region. The critical stripe may contain information to rebuild the particular redundancy unit if there are further drive failures. This may be advantageous in that it may cause the RAID array to regain its redundancy such that a subsequent drive failure does not result in the loss of data.

In some optional embodiments of the present disclosure, critical stripes for redundancy units that are at a critical level may be stored in available regions on drives with the fewest number of critical stripes. This may be particularly advantageous in that it may ensure that a subsequent drive failure impacts fewer redundancy units than if a particular drive included many critical stripes.

In some optional embodiments of the present disclosure, a drive that failed, causing the particular redundancy unit to become critical, may be replaced by a new drive. The computer system may then rebuild the data of the particular redundancy unit on the new drive. The computer system may use the stored critical stripe to rebuild the data of the particular redundancy unit. This may be advantageous in that rebuilding the data for the particular redundancy unit may increase the redundancy of the RAID array and minimize the number of critical stripes stored on a particular drive.

In some optional embodiments of the present disclosure, the computer system may determine that a redundancy unit that was previously critical is no longer critical. The computer system may then release the regions where critical stripes are stored for the redundancy unit that is no longer critical. This space may then be available to store user data or as spare space. This may be particularly advantageous in that it may increase the amount of available storage space in the RAID array that is usable by a user.

The above summary is not intended to describe each illustrated embodiment or every implementation of the present disclosure. The aforementioned advantages represent example advantages, and therefore, not all advantages of the various embodiments are described herein. Furthermore, some embodiments of the present disclosure can exhibit none, some, or all of the advantages listed herein while remaining within the spirit and scope of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
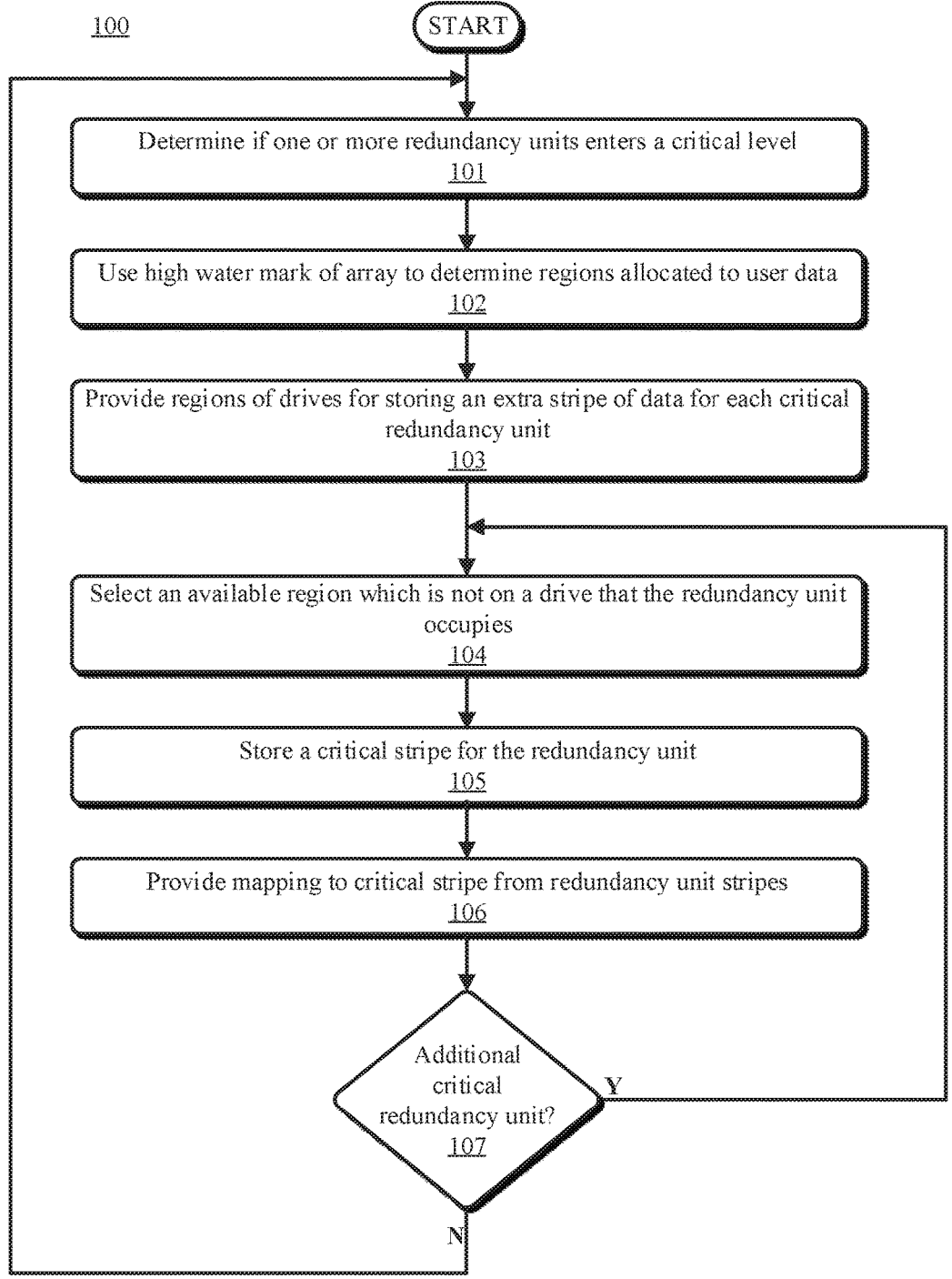
FIG. 1 illustrates a flowchart of an example method for regaining redundancy in distributed Redundant Array of Independent Disks (RAID) arrays using unallocated capacity, in accordance with embodiments of the present disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

The described method and system relate to using unused capacity (which may also be referred to as unallocated capacity as it has not been allocated to a host) in a distributed Redundant Array of Independent Disks (RAID) array to add redundancy back to critical strides. In a distributed RAID array, the data is split into redundancy units (also known as strides), which contain the data and the associated parity. The redundancy units are spread over the available drives.

If one or more drives fail, redundancy may be lost. Normally, redundancy is regained using spares (either distributed or global). If for some reason no spares are available, then the described method uses unallocated space on the array drives to store an extra stripe to restore redundancy to a critical unit. The extra stripe is stored on one of the remaining drives that does not already contain a stripe from the critical unit. In a real example, multiple redundancy units will be affected by the failure of two drives and the method determines suitable drives for each extra stripe required.

According to a first aspect of the present invention there is provided a computer-implemented method for regaining redundancy in storage arrays, comprising: monitoring a RAID array to determine if a failure of a drive in the array causes one or more redundancy units to enter a critical level, wherein a critical level is when a further failure will result in loss of data from the redundancy unit, and wherein a redundancy unit has multiple data stripes and one or more parity stripes; identifying available regions in the array which are not allocated to user data; determining for each critical redundancy unit, an available region which is in a drive of the array which does not contain any existing data of the redundancy unit; and storing a critical stripe in the available region, wherein the critical stripe contains sufficient information to rebuild the redundancy unit in case of further drive failure.

According to a second aspect of the present invention there is provided a system for regaining redundancy in storage arrays, including an array controller having a processor and a memory configured to provide computer program instructions to the processor to execute the function of components of the array controller, including: a critical level monitoring component for monitoring a RAID array to determine if a failure of a drive in the array causes one or more redundancy units to enter a critical level, wherein a critical level is when a further failure will result in loss of data from the redundancy unit, and wherein a redundancy unit has multiple data stripes and one or more parity stripes; a space determining component for identifying available regions in the array which are not allocated to user data; a region selection component for determining for each critical redundancy unit, an available region which is in a drive of the array which does not contain any existing data of the redundancy unit; and a critical stripe component for storing a critical stripe in the available region, wherein the critical stripe contains sufficient information to rebuild the redundancy unit in case of further drive failure.

According to a third aspect of the present invention there is provided a computer program product for regaining redundancy in storage arrays, the computer program product comprising a computer readable storage medium having program instructions embodied therewith, the program instructions executable by a processor to cause the processor to: monitor a RAID array to determine if a failure of a drive in the array causes one or more redundancy units to enter a critical level, wherein a critical level is when a further failure will result in loss of data from the redundancy unit, and wherein a redundancy unit has multiple data stripes and one or more parity stripes; identify available regions in the array which are not allocated to user data; determine for each critical redundancy unit, an available region which is in a drive of the array which does not contain any existing data of the redundancy unit; and store a critical stripe in the available region, wherein the critical stripe contains sufficient information to rebuild the redundancy unit in case of further drive failure.

In a RAID 6 array, block-level striping is provided with double distributed parity. Therefore, when a redundancy unit loses two drives (e.g., two data/parity stripes) the redundancy unit becomes critical in the sense that loss of another drive will result in loss of data. The number of drive failures before a redundancy units becomes critical depends on the RAID level. For example, in the case of RAID 6, two drive failures can be tolerated in a given redundancy unit before becoming critical. This means that, assuming two drive failures in a RAID 6 array, there are three options for each redundancy unit:

Redundant—no drive(s) that the unit is using has failed;
Degraded—the redundancy unit has lost a single drive, a further drive failure would not result in data loss;
Critical—the redundancy unit has lost two drives, a further drive failure would result in data loss.

Referring to FIG. 1, a flow diagram 100 shows an example embodiment of the described method, in accordance with embodiments of the present disclosure. The described method may be performed by a computer system (e.g., by a processor). In some embodiments, one or more operations of the described method may be performed by a user, or by the computer system in response to user input. The method may being at operation 101, where it may be determined if one or more redundancy units enter a critical level. This may occur when a drive fails and no spares are available. A critical level is when a further drive failure would result in data loss from the redundancy unit.

At operation 102, a high-water mark of allocated space on each drive may be used to determine regions allocated to user data. Assuming that space is allocated from an array in a sequential manner, it is possible to know the high-water mark as the highest logical block address (LBA) containing modified data. This is a simple way of knowing where the boundary is between allocated and unallocated space. More complex allocation schemes that can result in fragmentation may require a more complex method.

At operation 103, unallocated regions of each drive that may be used for storing an extra stripe of parity for each critical redundancy unit are identified. In drives that are not fragmented, the unallocated regions that may be used for storing an extra parity stripe may start directly following the highest LBA that contains modified data.

After identifying unallocated regions of each drive at operation 103, operations 104-106 may be performed for each critical redundancy unit identified at operation 101. For a critical redundancy unit, an available region may be selected that is not on a drive which the redundancy unit currently occupies at operation 104. At operation 105, a critical stripe for the redundancy unit may be stored in the selected available region. In some embodiments, the extra critical stripe cannot be stored on any drive the redundancy unit currently occupies since a failure of that drive would result in the loss of the original data and additional parity.

Exactly what the critical stripe contains would be implementation specific. In some embodiments, the critical stripe has to contain enough information to allow the data to be rebuilt following losing another stripe in the redundancy unit. In some embodiments, the critical stripe may contain rebuilt data of one of the stripes lost by the drive failure, but in other embodiments, there may be more complex solutions that provide other benefits such as performance boosts.

At operation 106, each surviving stripe in the redundancy may be mapped to the critical stripe so that the critical stripe can be updated when the other stripes are changed. The mapping may be stored in a non-volatile structure in the appliance that governs the array or in metadata stored on the array itself. The mapping may alternatively be stored by uniquely identifying the critical stripe's location in metadata in the redundancy unit's stripes. Many drives provide a small amount of space for a data integrity field that may be re-purposed for this such that reading any stripe gives the location of the corresponding critical stripe.

At decision block 107, it may be determined if there is another critical redundancy unit. If another critical redundancy unit is found at decision block 107, the method may return to operation 104 for the next redundancy unit to store a critical stripe. However, if there are no more critical redundancy units resulting from the drive failure, the method may loop to operation 101 to await further redundancy units entering a critical level, usually due to a subsequent drive failure. In some embodiments, such as those where the method is manually or periodically executed, the method may end if no additional critical redundancy units are identified at decision block 107.

In some embodiments, if a redundancy unit has a critical stripe in the unallocated space and a further drive fails, making the redundancy unit critical again, it may require another critical stripe to be stored on a different drive. This process may continue until either all unallocated space contains critical stripes or there are no more drives available that do not already contain a stripe for that redundancy unit.

In some embodiments, if the space that is housing the critical stripes is required (e.g., by a different or critical application), either the space cannot be used or the critical stripes would need to be erased. If multiple drive failures mean that some redundancy units have multiple critical stripes in the unallocated space, then removing them would result in data loss. How this is handled would be implementation specific.

The described method shown in FIG. 1 may be applied to various forms of RAID array having parity stripes. Some embodiments may require a RAID array where a stripe does not use every drive, as it may be necessary to find an independent drive to store the new stripe on. In some embodiments where no additional drives that do not already contain a stripe for a redundancy unit exist, unallocated space in one of the drives may be used to store the necessary critical stripe(s), even though that drive already contains a critical stripe for the redundancy unit. The drive may be selected based on its likelihood of failure (e.g., its age, the number of failed blocks on it, the type of drive, etc.)

Figure 2:
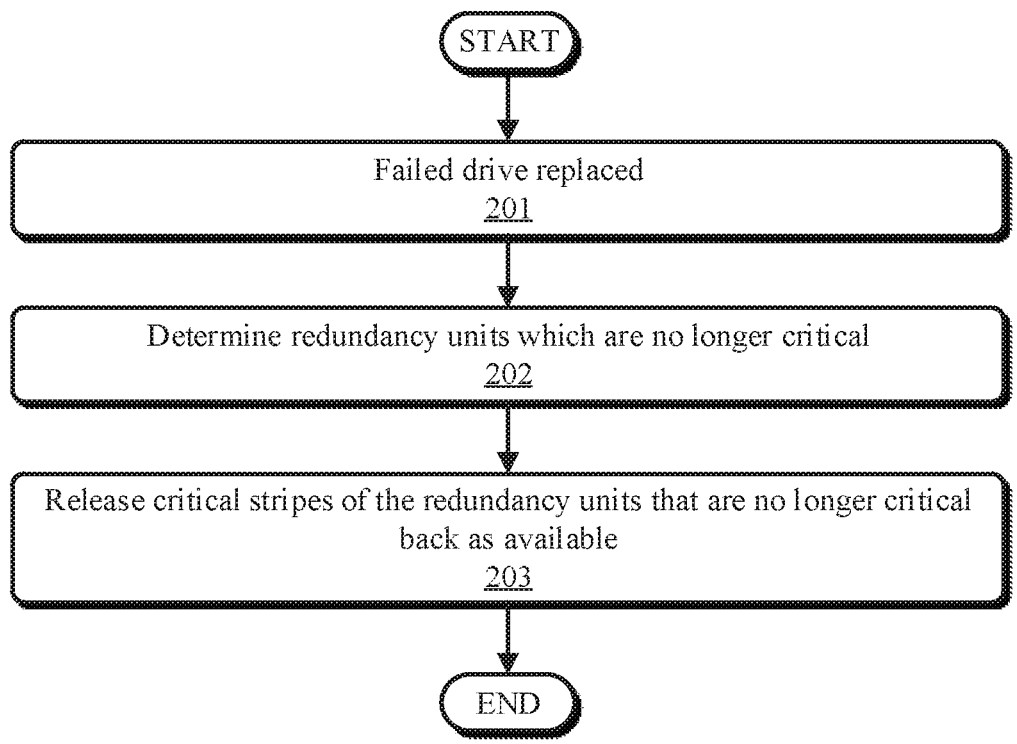
FIG. 2 illustrates a flowchart of an example method for making stripes of redundancy units that are no longer critical available, in accordance with embodiments of the present disclosure.

Referring now to FIG. 2, a flow diagram 200 shows an example embodiment of a further aspect of the described method, in accordance with embodiments of the present disclosure.

At operation 201, a failed drive from the RAID array may be replaced. When a failed drive is replaced, the data on the critical redundancy units may be rebuilt first such that one or more of the redundancy units in the system are either redundant or degraded (i.e., not critical). In some embodiments, one or more of the redundancy units may remain critical.

At operation 202, it may be determined which redundancy units are no longer critical due to the rebuild of the drive. The regions in which critical stripes are stored of the redundancy units that are no longer critical may be released and may become available for user data or spare space again at operation 203.

Figure 3A:
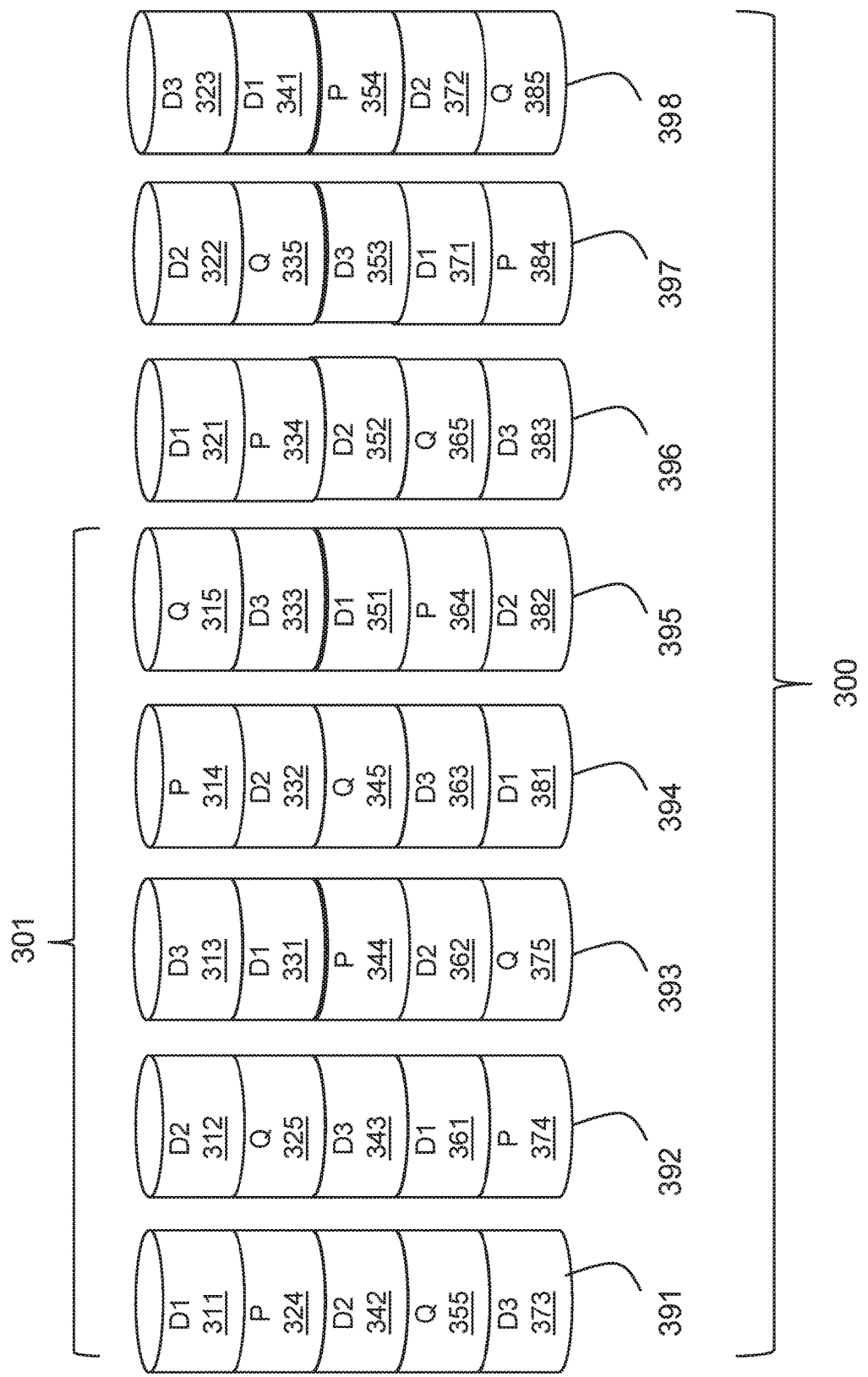
FIGS. 3A-3C depict schematic diagrams illustrating the method of FIG. 1 in a RAID array with a redundancy unit, in accordance with embodiments of the present disclosure.
Figure 3B:
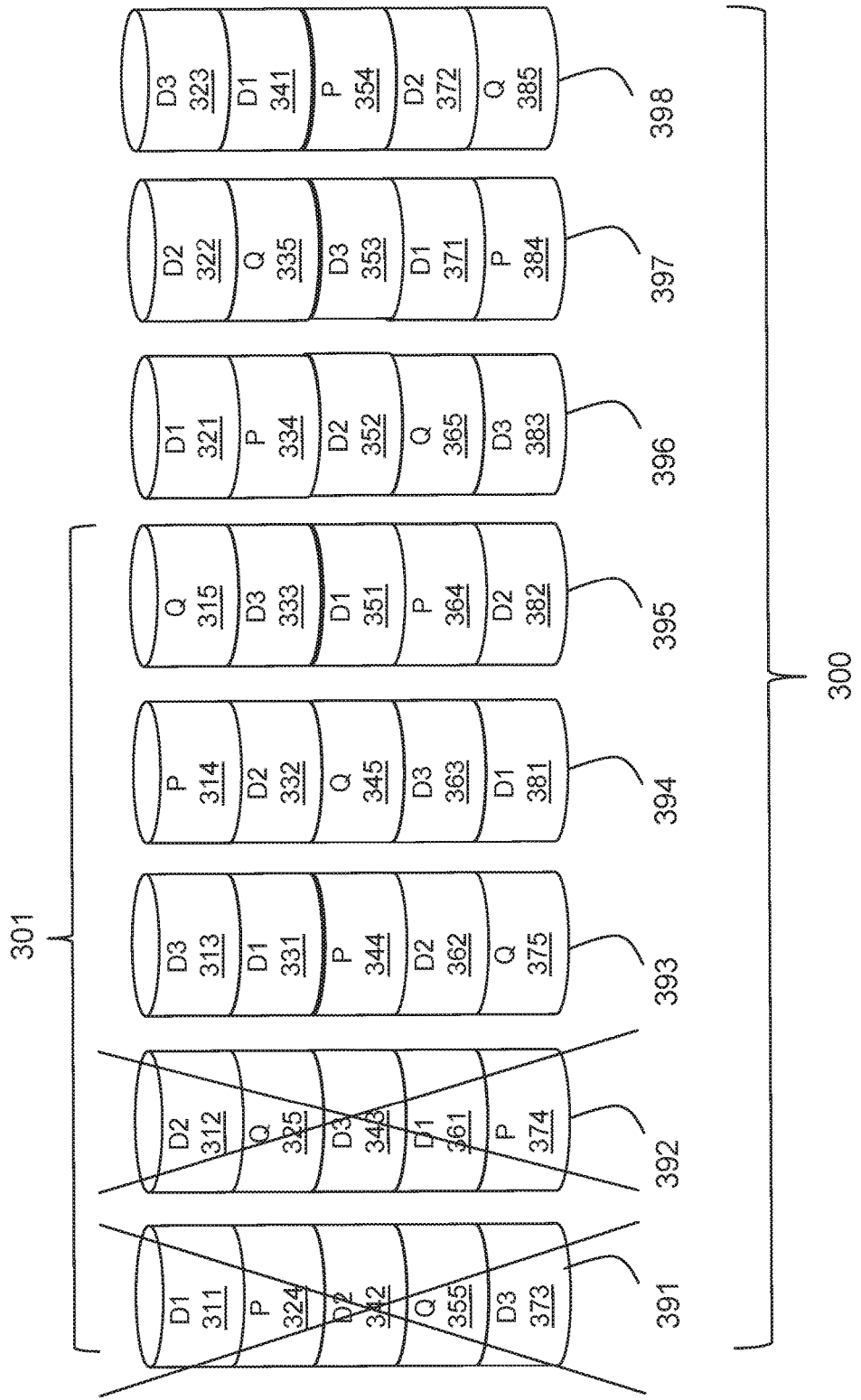
Figure 3C:
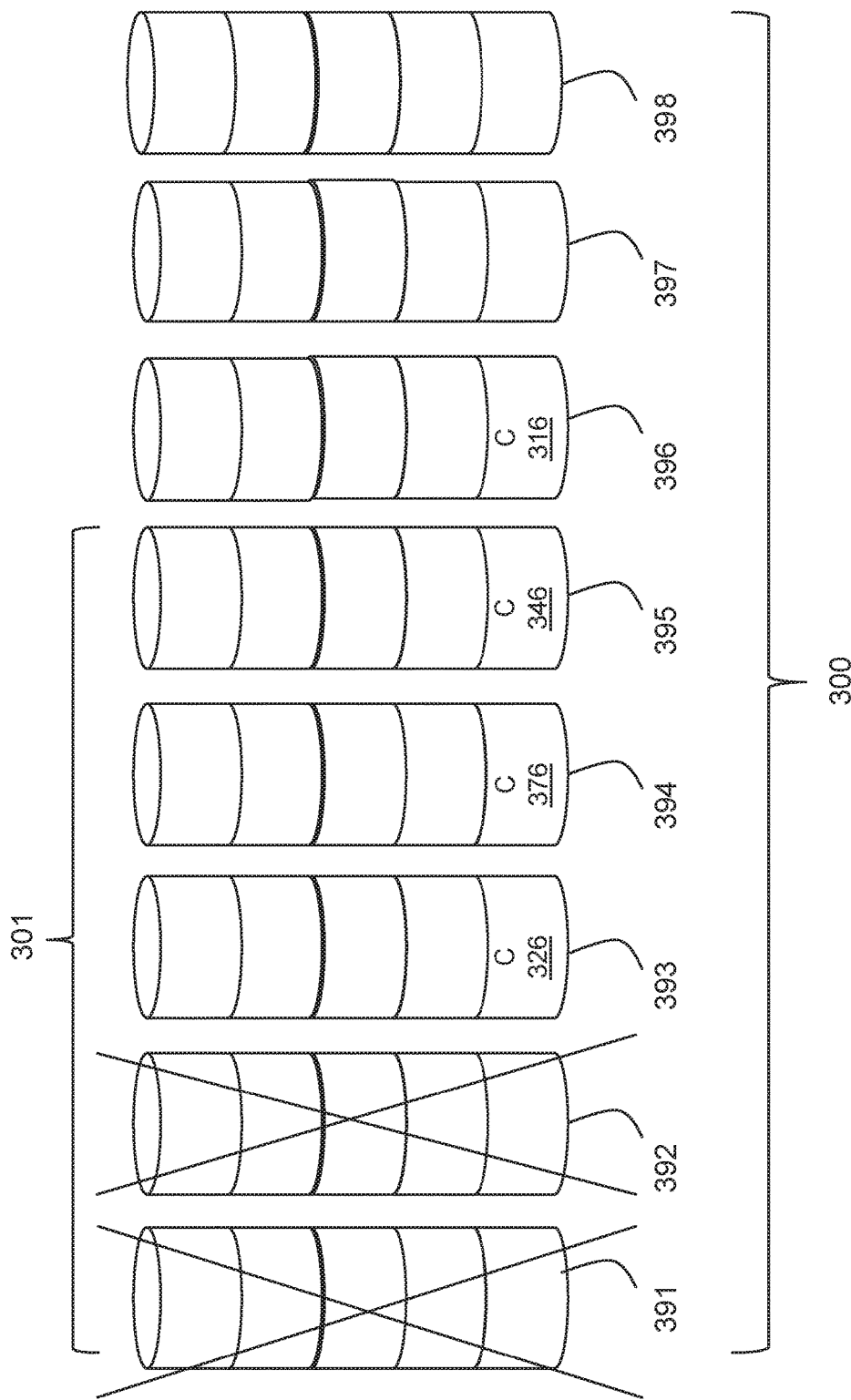

Referring now to FIGS. 3A to 3C, schematic diagrams illustrate an example embodiment of the described method.

FIG. 3A shows a RAID 6 array 300 with one or more redundancy units. Each redundancy unit may contain three data stripes D1, D2, and D3, as well as two parity stripes P, Q which may be distributed over eight drives 391-398. For example, the RAID 6 array 300 may include eight redundancy units (collectively referred to as redundancy units 301). A first redundancy unit may include stripes D1 311, D2 312, D3 313, P 314, and Q 315. A second redundancy unit may include stripes D1 321, D2 322, D3 323, P 324, and Q 325. A third redundancy unit may include stripes D1 331, D2 332, D3 333, P 334, and Q 335. A fourth redundancy unit may include stripes D1 341, D2 342, D3 343, P 344, and Q 345. A fifth redundancy unit may include stripes D1 351, D2 352, D3 353, P 354, and Q 355. A sixth redundancy unit may include stripes D1 361, D2 362, D3 363, P 364, and Q 365. A seventh redundancy unit may include stripes D1 371, D2 372, D3 373, P 374, and Q 375. An eighth redundancy unit may include stripes D1 381, D2 382, D3 383, P 384, and Q 385.

Referring now to FIG. 3B, a scenario is shown in which the first two drives 391 and 392 of the RAID 6 array 300 fail. The third through eighth drives 393-398 are still operational. With this failure, the redundancy units 301 are spread over the three level of redundancy as follows:

Redundant: The third redundancy unit (D1 331, D2 332, D3 333, P 334, Q 335), and the eighth redundancy unit (D1 381, D2 382, D3 383, P 384, Q 385). Both of these redundancy units do not lose any data by the failure of the drives 391, 392.

Degraded: The fifth redundancy unit, (D1 351, D2 352, D3 353, P 354, Q 355), and sixth redundancy unit (D1 361, D2 362, D3 363, P 364, Q 365). Both of these redundancy units loose a stripe of data in the failure and therefore become degraded.

Critical: The first redundancy unit (D1 311, D2 312, D3 313, P 314, Q 315), the second redundancy unit (D1 321, D2 322, D3 323, P 324, Q 325), the fourth redundancy unit (D1 341, D2 342, D3 343, P 344, Q 345), and the seventh redundancy unit (D1 371, D2 372, D3 373, P 374, Q 375). These four redundancy units become critical as they each loose two stripes of data in the failure of drives 391 and 392.

The distribution of the redundancy units over the redundancy levels is dependent on the redundancy unit width compared to the total number of drives. Assuming that the spares have all been used (or no spares were provided), the four critical redundancy units are susceptible to data loss if another drive fails. In this example, any 3rd drive failure will result in data loss in at least one redundancy unit.

Critical stripes for each of the four critical redundancy units may be saved in unallocated regions of each drive. In this example, the system chooses the drive with the lowest number of critical chunks that is not already used by the redundancy unit and the drives are filled from the bottom up.

For example, if there are drives A B C D E and F and they have the following amount of critical stripes on A=4 B=4

C=4 D=3 E=6 F=5 and there is a stripe that is on A B C and D, based on the counts it would be preferable to place the stripe on D. However, as the stripe is already using D, it would choose F as that is the drive with the lowest number of stripes currently on it that is not being used by the stripe.

Referring now to FIG. 3C, critical stripes which may be saved for each of the four critical redundancy units are shown. For clarity, each stripe of the redundancy units 301 is omitted from FIG. 3C, except for the critical stripes. The critical stripe for each redundancy unit must be in a drive which does not contain an existing stripe of the redundancy unit. For example, the first redundancy unit (D1 311, D2 312, D3 313, P 314, Q 315 in FIGS. 3A and 3B), which has lost D1 311 and D2 312 in the failure, has a critical stripe C 316 saved in the sixth drive 396. This may be because the sixth drive 396 does not contain any of the remaining stripes of the first redundancy unit (e.g., it does not contain D3 313, P 314, or Q 315).

Likewise, the second redundancy unit (D1 321, D2 322, D3 323, P 324, Q 325 in FIGS. 3A and 3B), which has lost P 324 and Q 325 in the failure, has a critical stripe C 326 saved in the third drive 393. This may be because the third drive 393 does not contain any of the remaining stripes of the second redundancy unit (e.g., it does not contain D1 321, D2 322, or D3 323). The fourth redundancy unit (D1 341, D2 342, D3 343, P 344, Q 345 in FIGS. 3A and 3B) which has lost D2 342 and D3 343 in the failure, has a critical stripe C 346 saved in the fifth drive 395. This may be because the fifth drive 395 does not contain any of the remaining stripes of the fourth redundancy unit (e.g., it does not contain D1 321, P 344, or Q 345). Finally, the seventh redundancy unit (D1 371, D2 372, D3 373, P 374, Q 375 in FIGS. 3A and 3B) which has lost D3 373 and P 374 in the failure, has a critical stripe C 376 saved in the fourth drive 394. This may be because the fourth drive 394 does not contain any of the remaining stripes of the seventh redundancy unit (e.g., it does not contain D1 371, D2 372, or Q 375). In the example shown in FIGS. 3A-3B, the seventh and eighth drives 397-398 do not contain any critical stripes.

If the first failed drive 391 is replaced, the extra critical stripes C 326, 376, 346, 316 would then no longer be required and could be released back to the system for allocation for user data or spare space. If the second failed drive 392 is also replaced, the degraded redundancy units would be rebuilt and the array would be fully redundant again.

Figure 4:
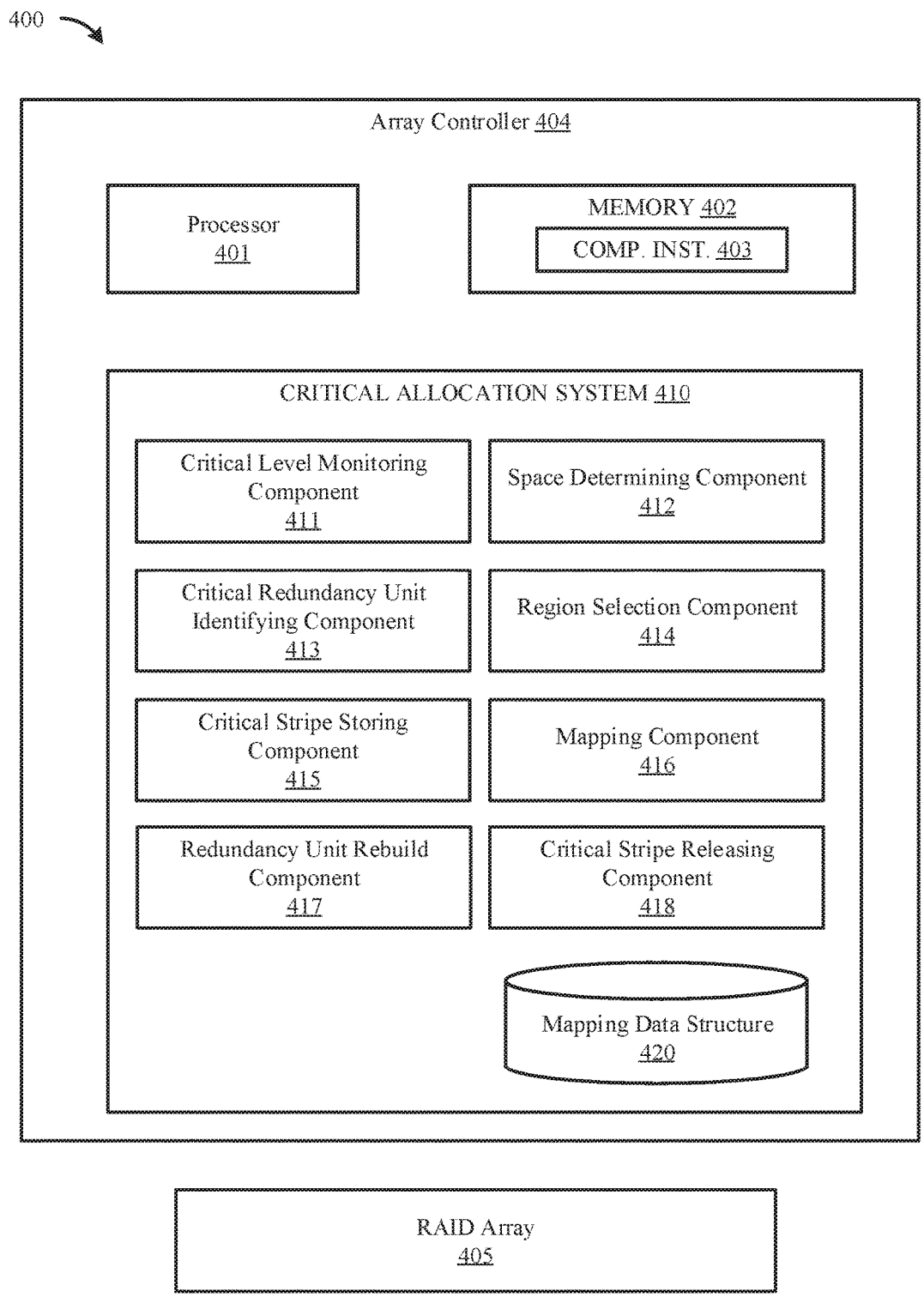
FIG. 4 illustrates a block diagram of an example system having an array controller and a RAID array, in accordance with embodiments of the present disclosure.

Referring now to FIG. 4, shown is an example embodiment of a system 400 that may perform the methods disclosed herein. The system 400 includes an array controller 404 and a RAID array 405. The array controller 404 may control the storage of data in the RAID array 405.

The array controller 404 may include at least one processor 401, a hardware module, or a circuit for executing the functions of the described components, which may be software units executing on the at least one processor 401. Multiple processors running parallel processing threads may be provided enabling parallel processing of some or all of the functions of the components. Memory 402 may be configured to provide computer instructions 403 to the at least one processor 401 to carry out the functionality of the components.

In some embodiments, the array controller 404 may include a critical allocation system 410, which may include a critical level monitoring component 411 for monitoring and determining if one or more redundancy units in the RAID array 405 enter a critical level. The critical allocation system 410 may also include a space determining component 412 for using a high-water mark of allocated space on each drive to determine regions allocated to user data and identifying unallocated regions of each drive that may be used for storing an extra stripe of parity for each critical redundancy unit.

In some embodiments, the critical allocation system 410 may also include a critical redundancy unit identifying component 413 for identifying a critical redundancy unit, and a region selection component 414 for selecting an available region that is not on a drive which the redundancy unit currently occupies. The critical allocation system 410 may also include a critical stripe storing component 415 for storing a critical stripe for the redundancy unit in the selected available region.

In some embodiments, the critical allocation system 410 may also include a mapping component 416 for mapping each surviving stripe in a redundancy unit to the critical stripe so that the critical stripe can be updated when the other stripes are changed. The mapping may be stored in a mapping data structure 420 which may be stored nonvolatile structure in the array controller that governs the array. Alternatively, the mapping may be stored in metadata stored on the RAID array 405 itself, or in metadata in the redundancy unit stripes.

In some embodiments, the critical allocation system 410 may also include a redundancy unit rebuild component 417 for rebuilding a critical redundancy unit when a failed drive is replaced. The critical allocation system 410 may also include a critical stripe releasing component 418 for releasing critical stripes of redundancy units, which are no longer critical, and releasing the space as available for user data or spare space again.

The described method and system give redundancy back to the critical redundancy units in a distributed RAID array once all the spares have been exhausted. This may be a method that uses unallocated space that has not been preselected as being spare when all the spares have been used. In some embodiments, this may be as a last resort to avoid data loss.

Typically, a storage system is not fully allocated to user data; there is space available for growth and/or emergencies. The described method and system may use the unallocated space to restore the redundancy to a critical redundancy unit as fast as possible when there are no spares available. The method sacrifices unallocated capacity of the set of physical resources to improve redundancy of the logical areas with the least redundancy within the same set.

Figure 5:
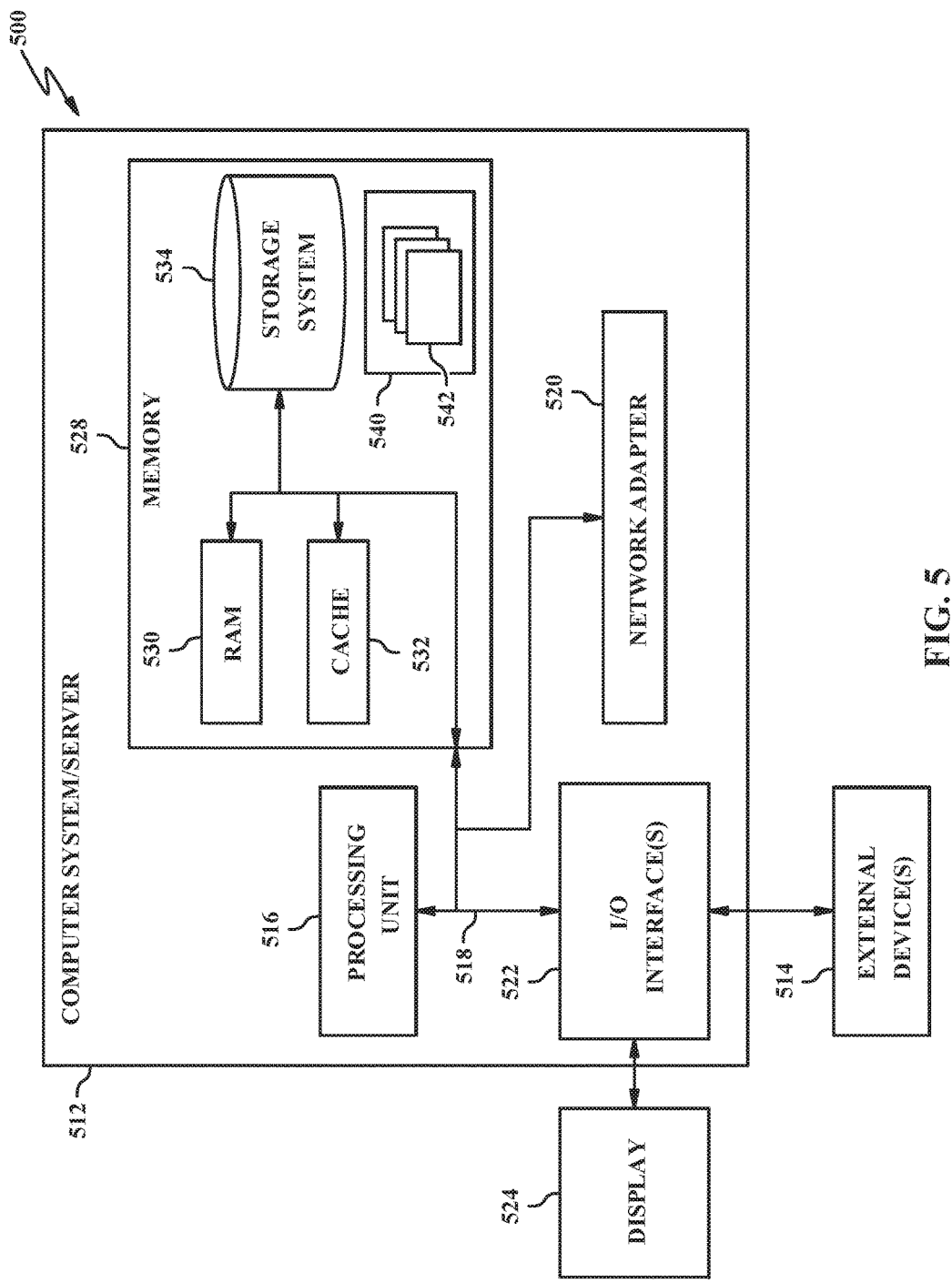
FIG. 5 depicts a cloud computing node according to an embodiment of the present invention.

Referring now to FIG. 5, a schematic of an example of a system 500 in the form of a computer system or server is shown which may be used in the described system, for example as the array controller 404 (shown in FIG. 4). Alternatively, in some embodiments, the array controller 404 may be a component of the system 500 (e.g., within a computer system/server 512). The computer system or server 512 may be operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

In FIG. 5, the computer system/server 512 is shown in the form of a general-purpose computing device. The components of the computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples include, but are not limited to: microcode, device drivers, redundant processing units, external disk drive arrays, RAID systems, tape drives, and data archival storage systems, etc.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
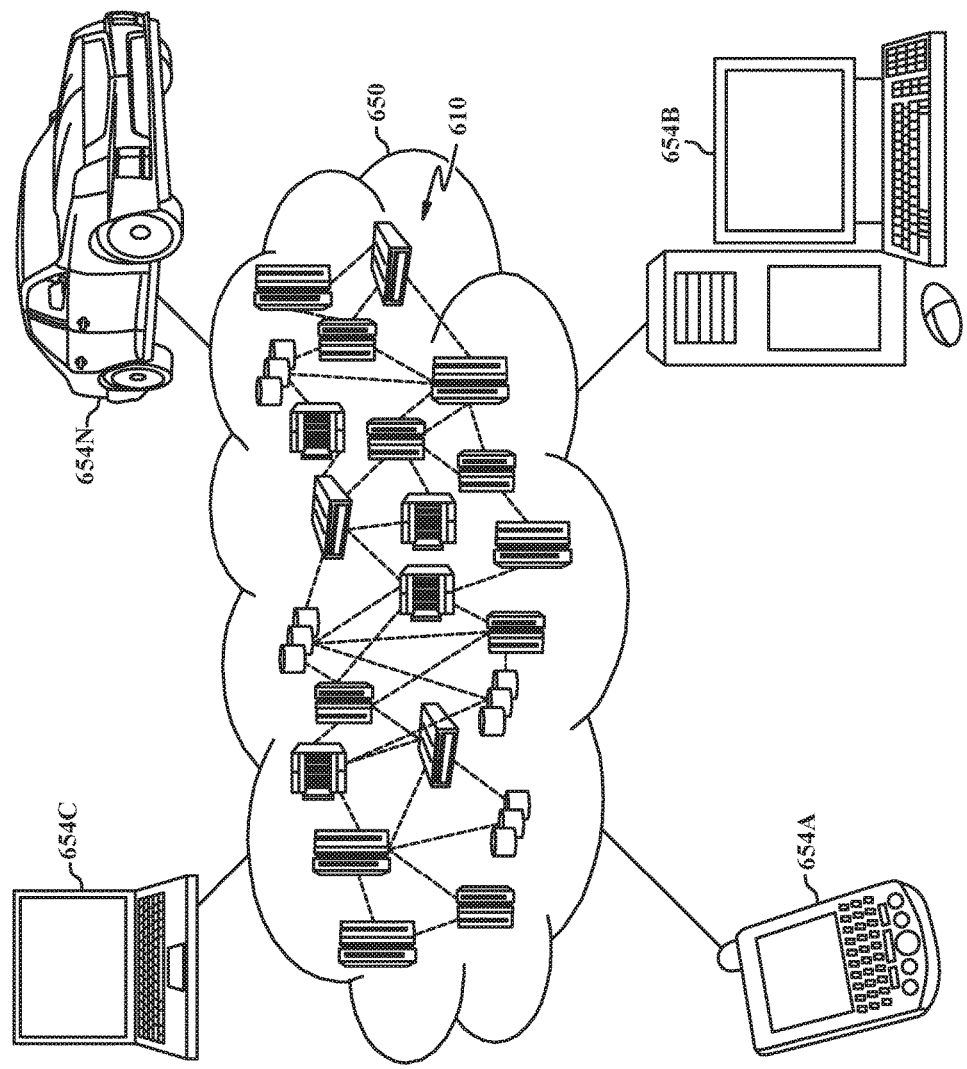
FIG. 6 depicts a cloud computing environment according to an embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms, and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
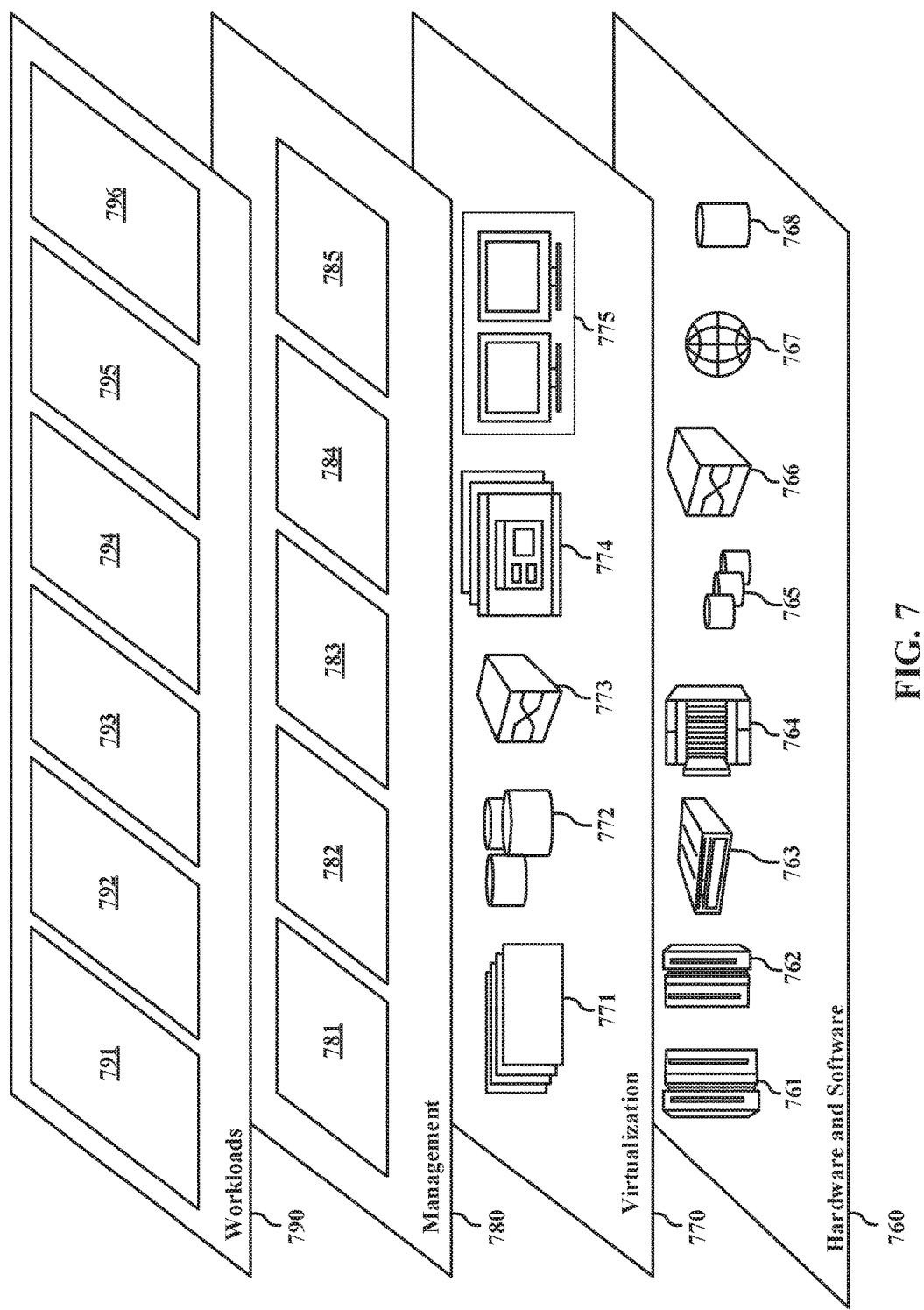
FIG. 7 depicts abstraction model layers according to an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provides pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and array controller processing 796 as described herein.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method for regaining redundancy in storage arrays, the method comprising:
    monitoring a Redundant Array of Independent Disks (RAID) array to determine whether one or more redundancy units are at a critical level, wherein a redundancy unit is at a critical level when an additional drive failure will result in loss of data from the redundancy unit, and wherein each redundancy unit has multiple data stripes and one or more parity stripes;
    identifying, in response to determining that a particular redundancy unit is critical, available regions in the RAID array which are not allocated to user data;
    determining, for the particular redundancy unit, an available region which is in a drive of the RAID array which does not contain any existing data of the particular redundancy unit; and
    storing a critical stripe in the available region, wherein the critical stripe contains sufficient information to rebuild the particular redundancy unit in case of further drive failure,
    wherein determining, for the particular redundancy unit, the available region which is in the drive of the RAID array which does not contain any existing data of the particular redundancy unit comprises:
    determining a drive in the RAID array that has a lowest number of critical stripes; and
    determining an available region in the drive having the lowest number of critical stripes.

2. The method as claimed in claim 1, the method further comprising providing a mapping from the existing stripes of the particular redundancy unit to the critical stripe.

3. The method as claimed in claim 2, wherein the mapping is stored in non-volatile data remote to the RAID array.

4. The method as claimed in claim 2, wherein the mapping is stored in metadata stored on the RAID array.

5. The method as claimed in claim 4, wherein the metadata is stored in a data field of stripes of a redundancy unit.

6. The method as claimed in claim 1, wherein the particular redundancy unit became critical due to a drive failure, and wherein the critical stripe contains rebuilt data of a stripe lost by the drive failure.

7. The method as claimed in claim 6, the method further comprising:
    replacing the failed drive with a new drive;
    rebuilding, in response to the replacing the failed drive, the data of the particular redundancy unit from the critical stripe in the new drive.

8. The method as claimed in claim 1, the method further comprising:
    determining, in response to storing the critical stripe, that the particular redundancy unit is no longer at a critical level;
    determining that a second drive in the RAID array has failed, the second drive having at least one stripe of the particular redundancy unit;
    determining that the failure of the second drive has made the particular redundancy unit critical again;
    storing a second critical stripe of the particular redundancy unit on a third drive in the RAID array, wherein the third drive does not contain any existing data of the particular redundancy unit prior to the storing the second critical stripe.

9. The method as claimed in claim 1, the method further comprising:
    determining that at least one redundancy unit is no longer critical; and
    releasing regions where critical stripes of the at least one redundancy units that are no longer critical are stored in order for the regions to become available for user data or spare space.

10. The method as claimed in claim 1, wherein the method is provided as a service in a cloud environment.

11. A system for regaining redundancy in storage arrays, including an array controller having a processor and a memory configured to provide computer program instructions to the processor to execute the function of components of the array controller, including:
    a critical level monitoring component for monitoring a Redundant Array of Independent Disks (RAID) array to determine if a failure of a drive in the array causes one or more redundancy units to enter a critical level, wherein a critical level is when a further failure will result in loss of data from the redundancy unit, and wherein a redundancy unit has multiple data stripes and one or more parity stripes;

a space determining component for identifying available regions in the RAID array which are not allocated to user data;

a region selection component for determining for each critical redundancy unit, an available region which is in a drive of the RAID array which does not contain any existing data of the redundancy unit, wherein the region selection component is further configured to determine an available region which is in a drive having a lowest number of critical stripes; and a critical stripe component for storing a critical stripe in the available region, wherein the critical stripe contains sufficient information to rebuild the redundancy unit in case of further drive failure.

12. The system as claimed in claim 11, the system further comprising a mapping component for providing a mapping from the existing stripes of the redundancy unit to the critical stripe.

13. The system as claimed in claim 12, wherein the mapping is stored in non-volatile data remote to the RAID array.

14. The system as claimed in claim 12, wherein the mapping is stored in metadata stored on the RAID array.

15. The system as claimed in claim 14, wherein the metadata is stored in a data field of stripes of a redundancy unit.

16. The system as claimed in claim 11, the system further comprising a redundancy unit rebuild component for rebuilding the data of the critical redundancy unit when a failed drive is replaced.

17. The system as claimed in claim 11, the system further comprising a critical stripe releasing component for releasing regions where critical stripes of the redundancy units that are no longer critical are stored in order for the regions to become available for user data or spare space again.

18. A computer program product for regaining redundancy in storage arrays, the computer program product comprising a computer readable storage medium having program instructions embodied therewith, the program instructions executable by a processor to cause the processor to perform a method comprising:

monitoring a Redundant Array of Independent Disks (RAID) array to determine whether one or more redundancy units are at a critical level, wherein a redundancy unit is at a critical level when an additional drive failure will result in loss of data from the redundancy unit, and wherein each redundancy unit has multiple data stripes and one or more parity stripes;

identifying, in response to determining that a particular redundancy unit is critical, available regions in the RAID array which are not allocated to user data;

determining, for the particular redundancy unit, an available region which is in a drive of the RAID array which does not contain any existing data of the particular redundancy unit; and storing a critical stripe in the available region, wherein the critical stripe contains sufficient information to rebuild the particular redundancy unit in case of further drive failure, wherein determining, for the particular redundancy unit, the available region which is in the drive of the RAID array which does not contain any existing data of the particular redundancy unit comprises:

determining a drive in the RAID array that has a lowest number of critical stripes; and determining an available region in the drive having the lowest number of critical stripes.

* * * * *